(12) United States Patent
Dean

(10) Patent No.: US 9,237,059 B2
(45) Date of Patent: *Jan. 12, 2016

(54) METHOD AND APPARATUS FOR DYNAMIC MAPPING

(75) Inventor: Michael Anthony Dean, Liberty Lake, WA (US)

(73) Assignees: VERIZON CORPORATE SERVICES GROUP INC., Basking Ridge, NJ (US); RAYTHEON BBN TECHNOLOGIES CORP., Cambridge, MA (US)

( * ) Notice: Subject to any disclaimer, the term of this patent is extended or adjusted under 35 U.S.C. 154(b) by 127 days.

This patent is subject to a terminal disclaimer.

(21) Appl. No.: 12/832,300

(22) Filed: Jul. 8, 2010

(65) Prior Publication Data

US 2010/0274923 A1    Oct. 28, 2010

Related U.S. Application Data

(63) Continuation of application No. 09/594,100, filed on Jun. 14, 2000, now Pat. No. 7,757,272.

(51) Int. Cl.
*H04L 29/06* (2006.01)
*H04L 29/12* (2006.01)

(52) U.S. Cl.
CPC ...... *H04L 29/12396* (2013.01); *H04L 61/2525* (2013.01); *H04L 63/0435* (2013.01)

(58) Field of Classification Search
CPC ................................ H04L 63/00; G06F 12/00
USPC .............. 726/2, 3, 13, 27; 713/160, 162, 190; 709/203, 223, 225; 711/200, 202, 206; 380/42, 28–30
See application file for complete search history.

(56) References Cited

U.S. PATENT DOCUMENTS 6,415,329 B1 * 7/2002 Gelman et al. ................ 709/245

OTHER PUBLICATIONS

Kewley, Dorene, et al., "Dynamic Approaches to Thwart Adversary Intelligence Gathering," 0-7695-1212-7-01, Jul. 2001, IEEE, pp. 176-185.

* cited by examiner

*Primary Examiner* — Joseph P Hirl
*Assistant Examiner* — Leynna Truvan

(57) ABSTRACT

A system for mapping and translating address information in a network is provided. The system includes a client-side address translator (120) and a server-side address translator (140). The client-side address translator (120) is configured to receive a data packet from a client (110). The data packet includes a first destination address representing the real destination address. The client-side address translator (120) maps the first destination address to another address using a mapping algorithm and transmits the data packet with the via the network (160). The server-side address translator (140) receives the data packet, translates the mapped address information back to the real destination address and forwards the data packet using the real destination address.

7 Claims, 6 Drawing Sheets

METHOD AND APPARATUS FOR DYNAMIC MAPPING

This is a continuation of prior U.S. patent application Ser. No. 09/594,100 filed Jun. 14, 2000, expected to issue on Jul. 13, 2010 as U.S. Pat. No. 7,757,272 and titled "METHOD AND APPARATUS FOR DYNAMIC MAPPING," the contents of which are expressly incorporated herein by reference. Benefits under 35 U.S.C. §120 are hereby claimed.

GOVERNMENT CONTRACT

This invention was made with Government support under Contract No. F30602-98-C-0012, awarded by the Air Force. The Government has certain rights in this invention.

FIELD OF THE INVENTION

The present invention relates generally to data communications and, more particularly, to mapping addresses in a network to confound network discovery.

BACKGROUND OF THE INVENTION

In distributed environments, such as network systems, client workstations typically transmit data to and receive data from a server over an unsecured network. The network typically routes a data packet from a client workstation to the server based on identifying information contained in the header of the data packet.

For example, on the Internet, data is typically transmitted using transmission control protocol (TCP) or user datagram protocol (UDP) on top of Internet protocol (IP). In these protocols, the IP destination address is a series of four 8-bit numbers defining a particular destination.

In typical scenarios, the server may be the front end of a company's internal network that connects client workstations to company resources, such as private databases of information, secured systems and various company programs. Adversaries of a company, or hackers, may attempt to infiltrate the company's internal network using packet "sniffers." A sniffer is a mechanism that captures all traffic transmitted to/from the server. The adversary may use the information obtained by a sniffer to "map" the company's network. For example, the adversary may identify the network topology of the company's network by observing the addresses and ports being used in data packets transmitted to/from the server. The adversary may then try to use this network topology information to access confidential information or maliciously attack the company's network.

Firewalls requiring passwords/IDs and other security features have been employed to lessen the risks of these types of attacks. Such mechanisms, however, often cannot prevent network discovery by sophisticated adversaries.

Therefore, a need exists for systems and methods that prevent unauthorized network discovery.

SUMMARY OF THE INVENTION

Systems and methods consistent with the present invention address this and other needs by changing destination information used when transmitting data between a client and a server over an unsecured network. The real destination information is mapped to another address at one end of the unsecured network. At the destination end of the unsecured network, the mapped addressed information is translated back to the real destination information.

In accordance with the purpose of the invention as embodied and broadly described herein, a method is provided in a network including at least one server for communicating with at least one client. The method includes receiving a data packet from a client workstation where the data packet includes a first destination address. The method also includes changing the first destination address to a second destination address, transmitting the data packet with the second destination address via the network and receiving the data packet transmitted via the network. The method further includes translating the second destination address back to the first destination address and forwarding the data packet to the server using the first destination address.

In another aspect of the present invention, a system for mapping destination information is provided. The system includes a memory configured to store a mapping algorithm. The system also includes a processor that is configured to receive a data packet including a first destination address representing a real destination address. The processor is also configured to change the first destination address to a second destination address using the mapping algorithm and transmit the data packet with the second destination address.

In still another aspect of the present invention, a computer-readable medium, having sequences of instructions stored thereon is provided. The instructions include sequences of instructions which, when executed by a processor, cause the processor to receive a data packet including a first destination address where the first destination address represents a mapped destination address. The instructions also cause the processor to perform the steps of translating the first destination address to a second destination address using a translation algorithm, where the second destination address represents a real destination address, and forwarding the data packet using the second destination address.

BRIEF DESCRIPTION OF THE DRAWINGS

The accompanying drawings, which are incorporated in and constitute a part of this specification, illustrate an embodiment of the invention and, together with the description, explain the principles of the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide dynamic mapping and translating of destination information used to transmit data packets in an unsecured network. A client-side device receives data to be transmitted to a server and modifies the destination address and port information. A dynamic address translation device at the server-side receives the modified destination address and port information and translates this information back to the real destination address and port information.

Exemplary System Configuration

Figure 1:
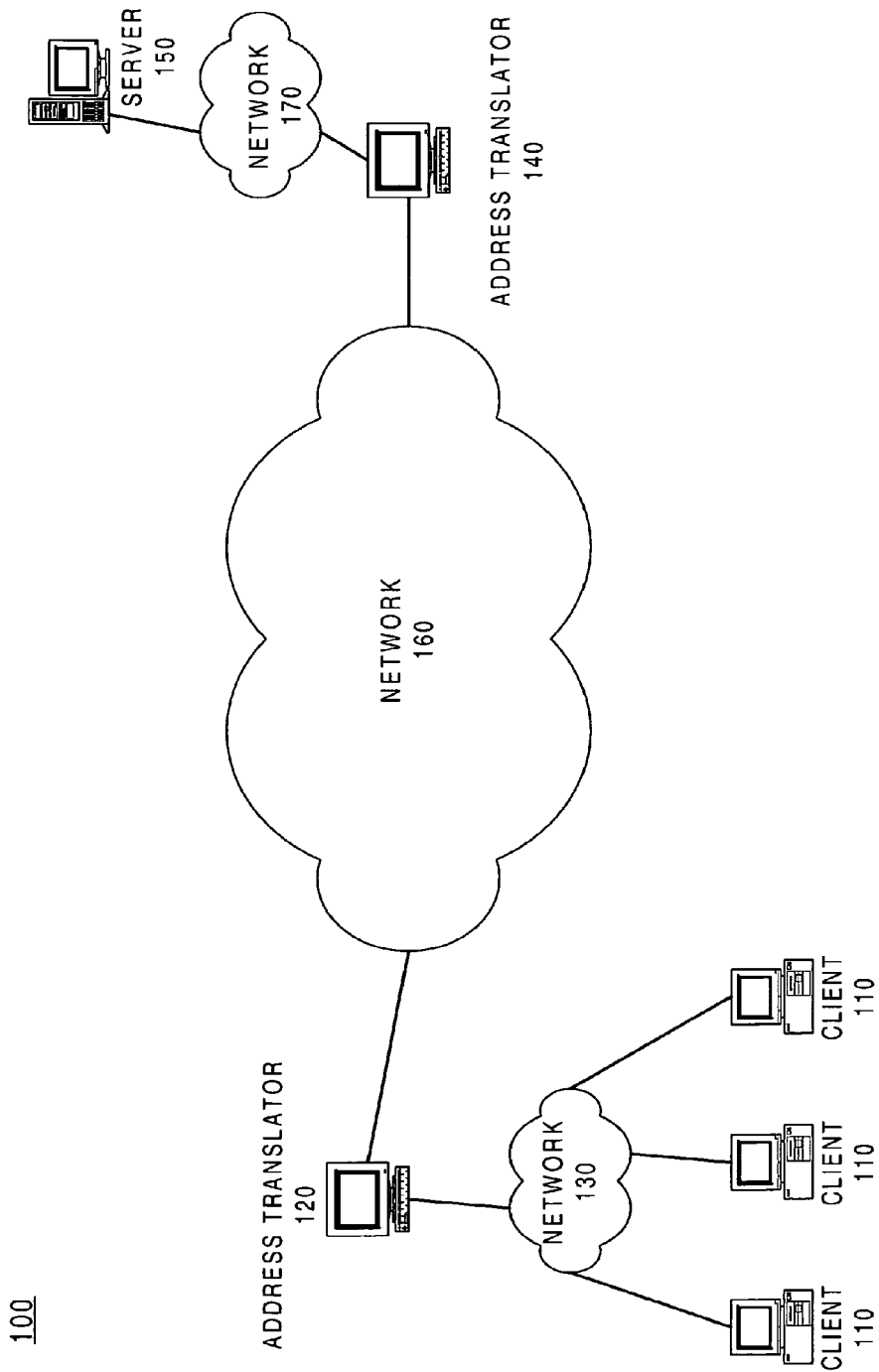
FIG. 1 is a block diagram of an exemplary system in which methods and systems consistent with the present invention may be implemented.

FIG. 1 is a diagram of an exemplary system 100 in which methods and systems consistent with the present invention may be implemented. The system 100 includes several clients 110, address translators 120 and 140, server 150 and networks 130, 160 and 170.

Clients 110 may each include any type of computer system, such as a personal computer or a laptop, with a connection to network 130. In an exemplary implementation consistent with the present invention, the clients 110 receive inputs from users representing data to be transmitted via network 160, such as data intended for server 150. The clients 110 generate data packets and then transmit the packets via network 130. The network 130 may include a local area network (LAN), wide area network (WAN), or another type of network. In alternative implementations, clients 110 may connect directly to address translator 120. Only three clients 110 are shown for simplicity. It should be understood, however, that additional clients 110 may be included in system 100, as described in more detail below.

Address translator 120 may include any type of computer system, such as a mainframe, minicomputer or a personal computer. Address translator 120 includes a connection to network 130 to communicate with clients 110. In alternative implementations, address translator 120 may include a mechanism for directly connecting to clients 110. Address translator 120 also includes a mechanism for communicating with address translator 140 via network 160. Address translator 120 may transmit data over network 160 via a wired, wireless or optical connection. The network 160 may include the Internet, a LAN, WAN, intranet or another type of network.

Address translator 120, consistent with the present invention, intercepts data packets transmitted from clients 110 and maps the destination information included with the data packets. The destination information may include, for example, an IP address and a TCP or UDP port. In this case, the address translator 120 maps the destination IP address and TCP/UDP port to another destination address and port, as described in more detail below. The address translator 120 then transmits the data packet with the mapped destinations via network 160. In some implementations of the present invention, the mapping of the destination information involves only the host portion of the IP address, leaving the network portion of the IP address and the resulting packet routing across network 160 unchanged.

The address translator 140 may be any type of computer system, such as a mainframe computer, minicomputer or a personal computer. The address translator 140 receives data transmitted from address translator 120 and translates the mapped destination information back to the real destination information. The address translator 140 then transmits the data to its intended destination, via network 170. Network 170 may include the Internet, a LAN, a WAN, an intranet or another type of network. In alternative implementations, the address translator 140 may connect directly to server 150. The address translators 120 and 140, as described in more detail below, prevent the mapping of a network, such as network 170, by unauthorized parties The server 150 may include any type of conventional computer system, such as a mainframe, minicomputer or personal computer, which may be used to receive and process information transmitted via network 170. The server 150 may be the front-end of a company's private network and may provide access to secured databases of information and private company programs.

Exemplary Client-Side Address Translator

Figure 2:
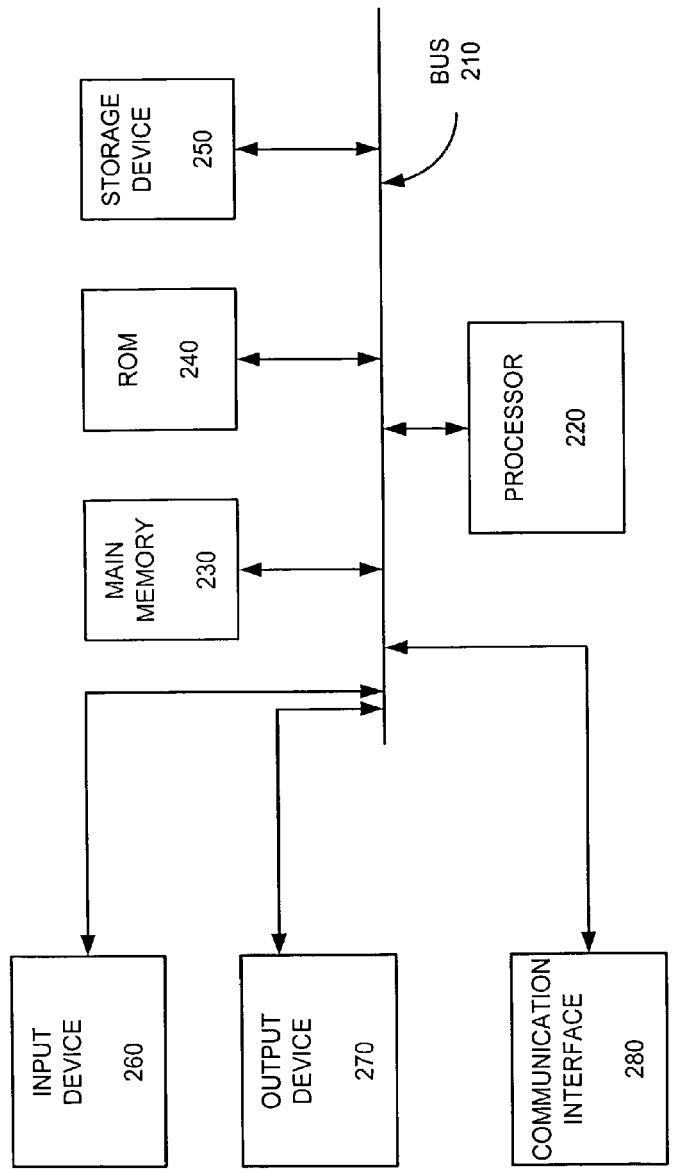
FIG. 2 is an exemplary block diagram of the client-side address translator of FIG. 1 in an implementation consistent with the present invention.

FIG. 2 illustrates an exemplary address translator 120 upon which a system and method, consistent with the present invention, may be implemented. The address translator 120 includes a bus 210, a processor 220, a main memory 230, a read only memory (ROM) 240, a storage device 250, an input device 260, an output device 270, and a communication interface 280. The bus 210 permits communication among the components of the address translator 120.

The processor 220 may include any type of conventional processor or microprocessor that interprets and executes instructions. Main memory 230 may be a random access memory (RAM) or other dynamic storage device that stores information and instructions for execution by processor 220. Main memory 230 may also store temporary variables or other intermediate information during execution of instructions by processor 220. The ROM 240 may include a conventional ROM device or another type of static storage device that stores static information and instructions for processor 220. The storage device 250 may include any type of magnetic or optical recording medium and its corresponding drive, such as a magnetic disk or optical disk and its corresponding disk drive.

The input device 260 may include any conventional mechanism that permits an operator to input information to the address translator 120, such as a keyboard, a mouse, a pen, voice recognition and/or biometric mechanisms, etc. The output device 270 may include any conventional mechanism that outputs information to the operator, including a display, a printer, a pair of speakers, etc.

The communication interface 280 may include any transceiver-like mechanism that enables the address translator 120 to communicate with other devices and/or systems. For example, the communication interface 280 may include mechanisms, such as a modem or an Ethernet interface, for communicating via a network, such as network 130 and network 160 (FIG. 1). The communication interface 280, consistent with the present invention, may include an internal network interface for receiving and transmitting data packets having real address information via network 130 and an external network interface for transmitting and receiving data packets having mapped destination information via network 160.

Address translator 120, consistent with the present invention, performs the functions necessary to map destination information in response to processor 220 executing sequences of instructions contained in memory 230. Such instructions may be read into memory 230 from another computer-readable medium, such as a data storage device 250, or from a separate device via communication interface 280. Execution of the sequences of instructions contained in memory 230 causes processor 220 to perform the process steps that will be described hereafter. In alternative embodiments, hard-wired circuitry may be used in place of or in combination with software instructions to implement the present invention. Thus, the present invention is not limited to any specific combination of hardware circuitry and software.

In an alternative implementation, consistent with the present invention, address translator 120 may be co-resident with client 110 on the same host device. In another alternative, the processes performed by address translator 120, described in more detail below, may be performed by software running on client 110, without the need for a separate address translation device. It should also be noted that multiple client-side address translators 120 may access the single server-side address translator 140.

Exemplary Server-Side Address Translator

Figure 3:
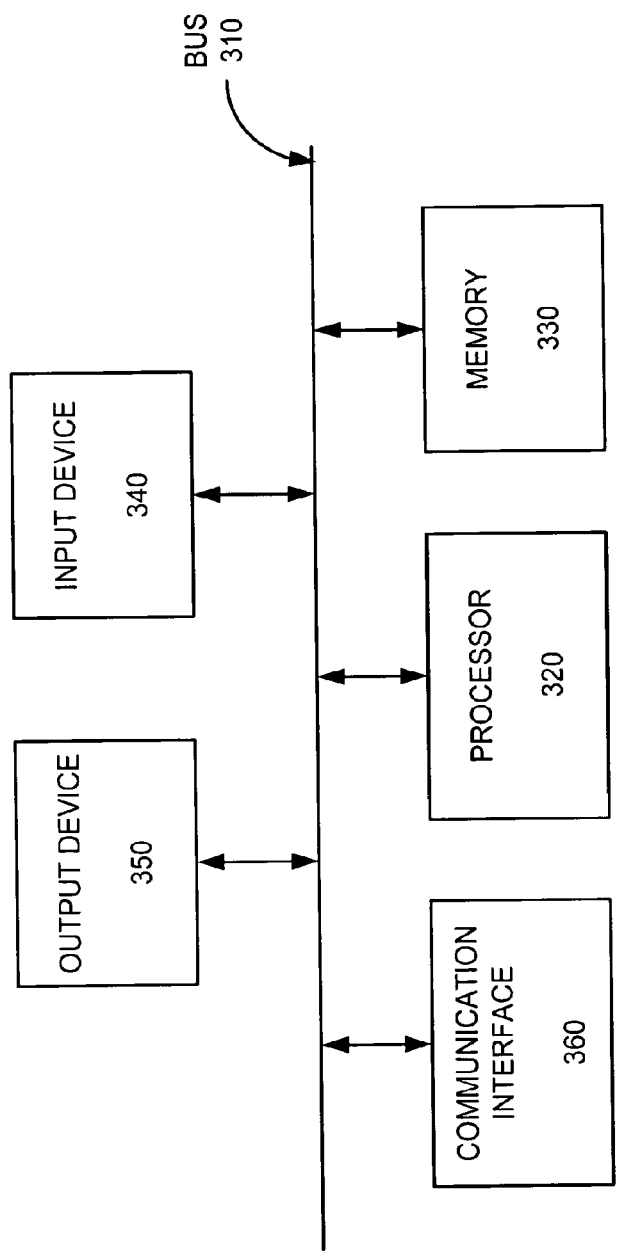
FIG. 3 is an exemplary block diagram of the server-side address translator of FIG. 1 in an implementation consistent with the present invention.

FIG. 3 illustrates an exemplary address translator 140 upon which a system and method consistent with the present invention may be implemented. The address translator 140 includes a bus 310, a processor 320, a memory 330, an input device 340, an output device 350, and a communication interface 360. The bus 310 permits communication among the components of the address translator 140.

The processor 320 may include any type of conventional processor or microprocessor that interprets and executes instructions. The memory 330 may include a RAM or another dynamic storage device that stores information and instructions for execution by the processor 320; a ROM or another type of static storage device that stores static information and instructions for use by the processor 320; and/or some other type of magnetic or optical recording medium and its corresponding drive.

The input device 340 may include any conventional mechanism that permits an operator to input information to the address translator 140, such as a keyboard, a mouse, a pen, voice recognition and/or biometric mechanisms, etc. The output device 350 may include any conventional mechanism that outputs information to the operator, including a display, a printer, a pair of speakers, etc.

The communication interface 360 may include any transceiver-like mechanism that enables the address translator 140 to communicate with other devices and/or systems. For example, the communication interface 360 may include mechanisms for communicating via networks, such as networks 160 and 170 (FIG. 1). The communication interface 360, consistent with the present invention, may include an external network interface for receiving and transmitting data packets having mapped destination information via network 160 and an internal network interface for transmitting and receiving data packets having real address information via network 170.

The address translator 140, consistent with the present invention, performs the functions necessary to translate the mapped destination information to the real destination information in response to processor 320 executing sequences of instructions contained in memory 330. Such instructions may be read into memory 330 from another computer-readable medium or from a separate device via communication interface 360. Execution of the sequences of instructions contained in memory 330 causes the processor 320 to perform the process steps that will be described hereafter. In alternative embodiments, hard-wired circuitry may be used in place of or in combination with software instructions to implement the present invention. Thus, the present invention is not limited to any specific combination of hardware circuitry and software.

Exemplary Processing for Mapping Destinations

Figure 4:
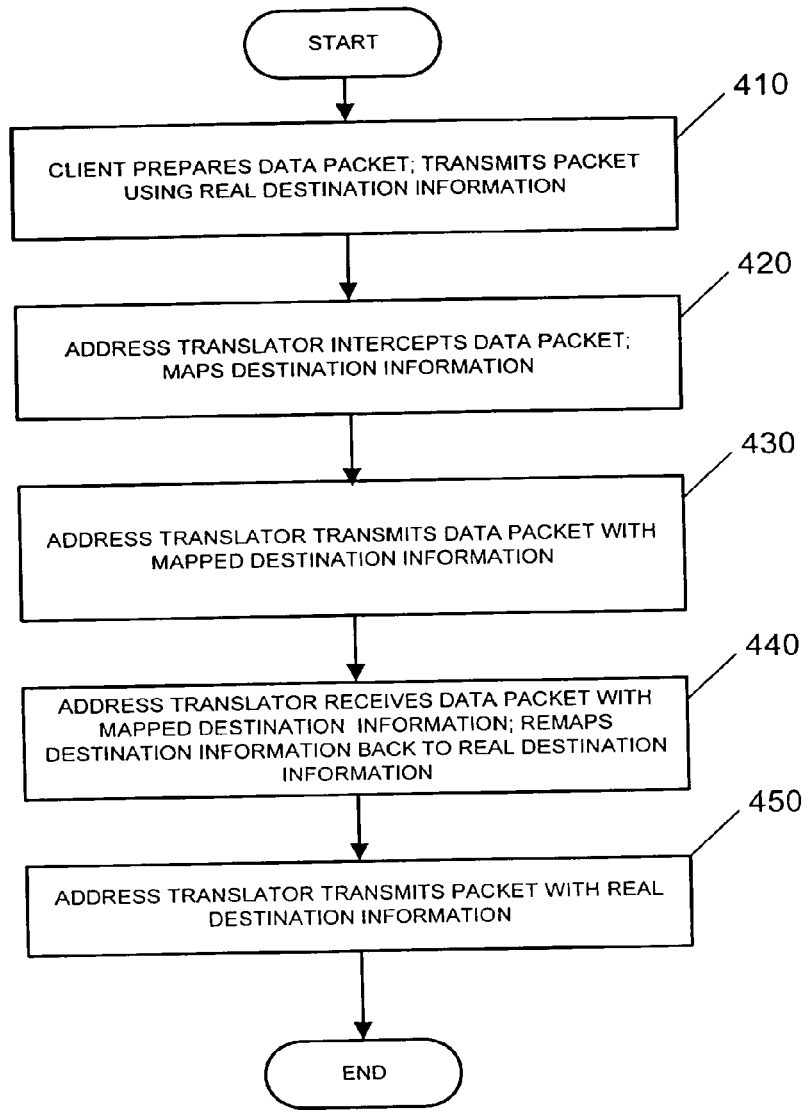
FIG. 4 is a flowchart of processing, consistent with the present invention, for mapping address information in a manner consistent with the present invention.

FIG. 4 is a flowchart illustrating exemplary processing for performing address mapping and translating in a manner consistent with the present invention. Processing begins when a user, via a client 110, wishes to transmit data via network 160. The user enters the information into client 110. The client 110 then generates a data packet with a packet header (step 410). The packet header may include the destination address of the data packet and a port identifier. For example, assume that the destination for the data packet is server 150. In this case, the destination information may include a port identifier associated with a particular port on server 150. The client 110 then transmits the data packet in a conventional manner via network 130 using the destination address associated with server 150 (step 410).

The address translator 120 intercepts the data packet intended for server 150 (step 420). The packet at this point includes the real destination information associated with server 150. For example, the destination information, consistent with the present invention, may include an IP address associated with server 150 and a port identifier associated with a particular port on server 150. The address translator 120 then maps the real destination information for the data packet (step 420).

For example, suppose that address translator 120 receives an IP packet having a destination address and port identifier of 4.22.161.5:1444. The first four numbers represent the IP address associated with server 150 and the last number represents a particular port on server 150. The address translator 120 then maps the destination information to another address. For example, the address translator 120 may map the destination address and port to 4.22.161.118:289.

The address translator 120, consistent with the present invention, may perform such mapping of the real destination address and port identifier using any type of mapping algorithm. For example, the mapping algorithm may employ a random "seed," i.e., number, in conjunction with mathematical operations for changing any or all of the four numbers representing the destination address and the single number representing the port. In the above example, the mapping algorithm mapped the fourth number in the destination address, "5," to "118" and the port number of "1444" to "289." In alternative implementations, the mapping algorithm may change any or all of the five numbers forming the destination address/port identifier.

According to an exemplary implementation, the mapping algorithm also employs conventional cryptographic techniques in the mapping process. For example, the mapping algorithm performed by the address translator 120 may employ a "secret key" to encrypt the mapped data. In this scenario, the mapping algorithm produces cryptographically protected, unpredictable mappings of destination information. Encrypting the data further confounds network discovery by increasing the work associated with a hacker trying to infiltrate server 150. Only a recipient, such as address translator 140, with the secret key is then able to decrypt the data. Therefore, even when a sniffer intercepts the data packets transmitted to server 150, the hacker cannot identify the destination information associated with the data packets without knowledge of the shared secret key.

After generating the mapped, encrypted destination information, the address translator 120 transmits the data packet via network 160 (step 430). The address translator 140 receives the data packet on the external side, i.e., non-secured side, of the interface to network 160 (step 440). The address translator 140 may then decrypt the destination information using the shared secret key associated with the algorithm used to encrypt the destination information (step 440). After decrypting the destination information, the address translator 140 translates the mapped address information and port identifier back to the real destination address and port identifier (step 440). In an exemplary implementation, the decrypting and translating processes may be performed concurrently.

In the scenario described above, the address translator 140 translates the mapped address/port of 4.22.161.118:289 back to 4.22.161.5.1444 (i.e., the actual destination address/port of the data packet). The address translator 140, consistent with the present invention, stores an algorithm that performs the reverse process performed by the mapping algorithm in the address translator 120. That is, the address translator 140 remaps the mapped destination information back to the original destination information using the reverse of the process used to map the original destination information. The address translator 140 then transmits the data packet, using the real destination address and port identifier for server 150, via network 170 (step 450).

In the manner described above, the real destination information is never transmitted over an unsecured network, such as network 160. Hackers, therefore, cannot "sniff" the real address/port identifier and are unable to map network 170.

The address translators 120 and 140 coordinate their mapping and translating operations to ensure that the data packet is properly routed to its destination. In other words, the address translator 120 and address translator 140 coordinate their efforts to determine when to perform the mapping/translating functions so that a destination address mapped at the client side of network 160 may be properly translated at the server side of the network 160. The address translators 120 and 140 may also coordinate changes in the secret keys used to perform the mapping/translating functions. In implementations consistent with the present invention, the coordination between the address translators 120 and 140 may be synchronized, staggered or randomized, as described in detail below.

Exemplary Processing for Synchronized Remapping

Figure 5:
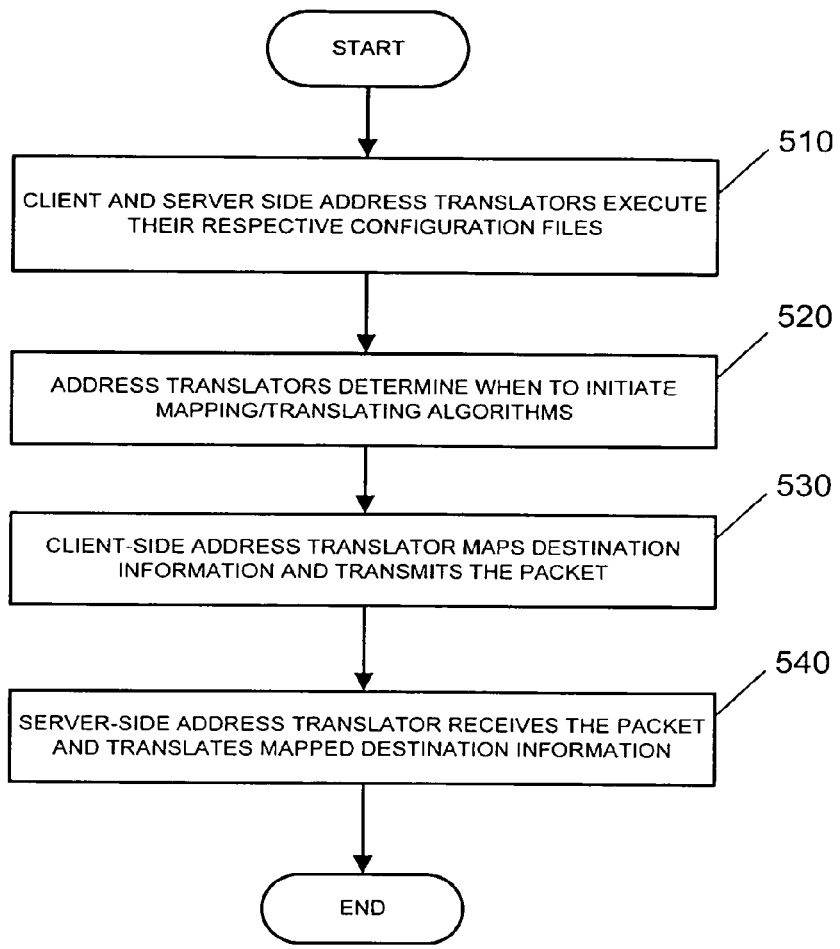
FIG. 5 is a flowchart of processing, consistent with the present invention, for providing synchronized mapping.

FIG. 5 illustrates processing, consistent with the present invention, for synchronized mapping of destination information. Processing begins upon power-up of the address translator 120 and the address translator 140. Upon power-up, the address translators 120 and 140 each begin execution of the normal start-up procedures, including execution of their respective configuration files (step 510).

According to an exemplary implementation, the configuration file for the address translator 120 stores information relating to how and when the mapping is initiated. As discussed previously, the mapping may be synchronized, staggered or randomized. Assume that the mapping is synchronized. In this scenario, synchronization may be accomplished via an external shared mechanism, such as time, or by direct communication between address translators 120 and 140.

The address translator 120 executes its configuration file and determines when to begin mapping the real destination information (step 520). Similarly, the address translator 140 determines when to begin translating the received destination information back to the real destination information (step 520).

For example, the configuration file in the address translator 120 for a clock-synchronized, non-staggered algorithm might indicate that all mappings begin at the start of an hour. Similarly, the configuration file in the address translator 140 indicates that the translating begins at the start of the hour. In this manner, the mapping/translating are synchronized using high precision clocks to ensure that data is seamlessly transmitted from clients 110 to the destinations, such as server 150.

In alternative implementations consistent with the present invention, the synchronized mapping may be initiated by direct communication between the address translators 120 and 140, such as by passing synchronization packets between address translator 120 and address translator 140. For example, the address translator 120 may send a packet to the address translator 140 establishing a shared private session key to control the mappings until a subsequent exchange between the address translators 120 and 140.

In another alternative, the synchronization packet may indicate that mapping is to begin at a certain time and date. This information may optionally be encrypted. The address translator 140 receives the synchronization packet, decrypts the packet if necessary, and determines when to begin translating the received destination information back to the real destination information. The address translator 140 may optionally send an acknowledgement packet back to the address translator 120 to confirm that the message has been received and that synchronization has been established.

After synchronization is established, suppose that the address translator 120 receives a data packet intended for server 150. The address translator 120 maps the destination information and transmits the packet (step 530). The address translator 140 receives the data packet, decrypts the data packet, if necessary, and translates the mapped destination information back to the real destination address (step 540). In this manner, destination information is dynamically mapped/translated with no impact on client 110 applications or server 150 applications.

In alternative implementations consistent with the present invention, the configuration files for the address translator 120 and the address translator 140 may also include information indicating when to change the mapping scheme used to map/translate the destination information. For example, the respective devices may include multiple algorithms for mapping/translating destination information and a schedule for when to change algorithms. The configuration file for address translator 120 may indicate that the mapping algorithm is to change every five minutes at 5, 10, 15, etc, minutes past the hour. Similarly, the configuration file for address translator 140 would indicate that the translating algorithm is to change every five minutes past the hour. Frequently changing the mapping/translating algorithm makes it more difficult for a hacker to succeed in trying to map the network topology associated with network 170 or devices connected to network 170, such as server 150. In each case, the synchronization mechanism used by address translators 120 and 140 ensures consistent transitions between the mapping intervals.

Exemplary Processing for Staggered and Randomized Remapping

Figure 6:
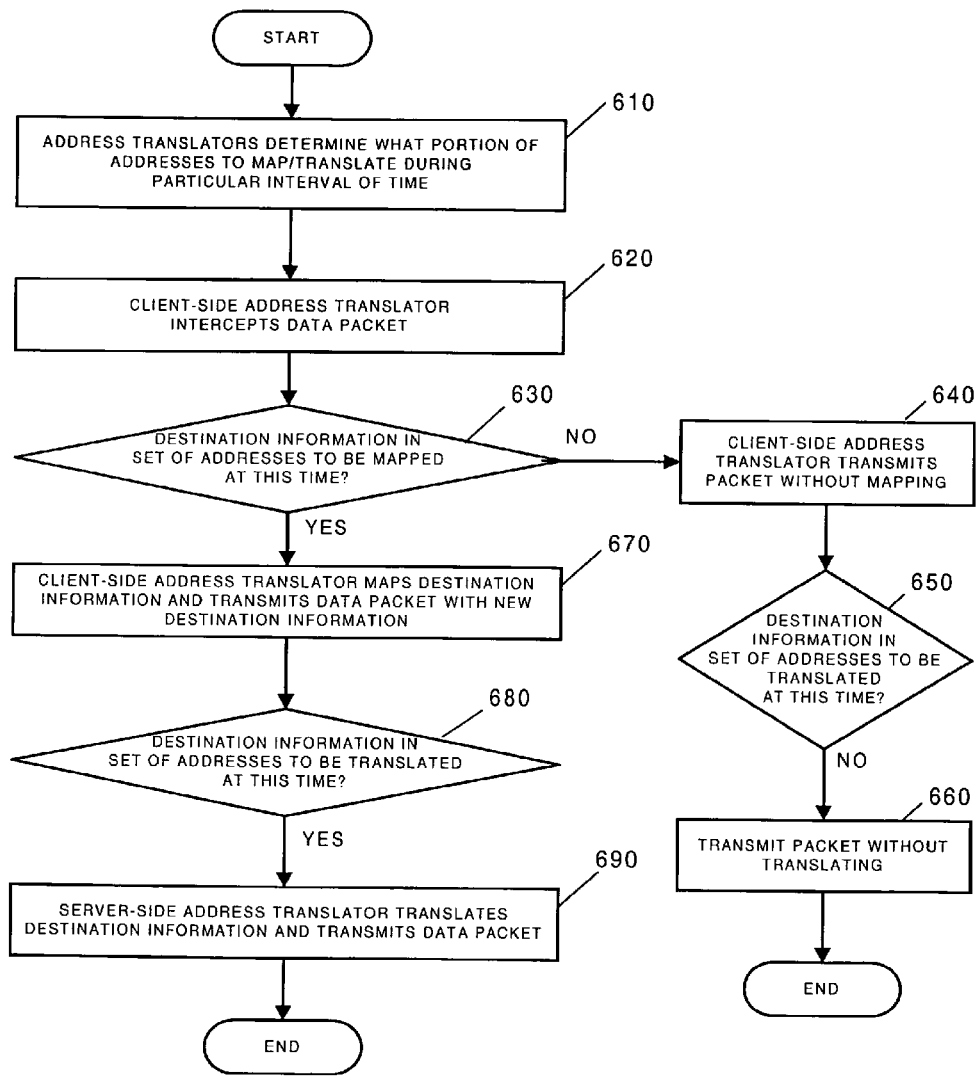
FIG. 6 is a flowchart of processing, consistent with the present invention, for providing staggered and randomized mapping.

FIG. 6 illustrates processing, consistent with the present invention, for staggered and randomized mapping of network destination information. Assume that the mapping mechanism is a staggered or randomized. In this scenario, the address translator 120 determines what portion of the addresses to map during the particular interval of time (step 610). Similarly, the address translator 140 determines what portion of the addresses are to be translated at a particular interval of time (step 610).

For example, the respective configuration files in the address translators 120 and 140 may indicate that at 12:01 AM on a particular date, that the mapping/translating is to begin for addresses between "XXX.XXX.XXX.0" and "XXX.XXX.XXX.100." Additional information may indicate that at 8:00 AM on the same date, that mapping/translating is to begin for addresses between "XXX.XXX.XXX.100" to "XXX.XXX.XXX.200." Further information may indicate that at 2:00 PM on the same date that mapping/translating is to begin for addresses from "XXX.XXX.XXX.200" to "XXX.XXX.XXX.255."

In implementations consistent with the present invention, any portion of addresses and ports may be mapped at any particular time. It should also be noted that not all addresses are necessarily mapped at any time. The address translator 120 and the address translator 140 each store the particular information regarding when to perform the mapping/translating for the given destination addresses/ports. Staggering the mapping/translating in this manner makes it more difficult for a hacker to attempt to determine how the destination information is being changed.

In alternative implementations consistent with the present invention, the staggered mapping may occur by passing packets between the address translator 120 and the address translator 140. For example, the address translator 120 may send a packet to the address translator 140 indicating that mapping is to begin for a certain set of address at a certain time and date. This information may optionally be encrypted. The address translator 140 receives the information, decrypts the packet if necessary, and determines when to begin translating the destination information associated with the set of addresses back to the real destination information. The address translator 140 may optionally send an acknowledgement packet back to the address translator 120 to confirm that the message has been received. Other mechanisms for identifying the particular address/ports to map at a particular time may also be used in implementations consistent with the present invention.

After determining the set of addresses to map at a particular time, suppose that the address translator 120 intercepts a data packet from client 110 (step 620). The address translator 120 determines whether the destination address transmitted with the data packet is one of the addresses included in the set of addresses that are to be mapped at that particular time (step 630). If the destination address is not in the set designated for mapping at that time, the address translator 120 transmits the data packet without mapping the destination information (step 640). The address translator 140 similarly receives the data packet and checks whether the destination address is in the set of addresses to be translated at that particular time (step 650). Assuming that the answer is "no," the address translator 140 transmits the data packet to server 150 without translating the destination address (step 660).

When the address translator 120 determines that the destination address is in the set of addresses to be mapped at the particular time (step 630), the address translator 120 maps the destination information using the mapping algorithm (step 670). The address translator 120 may concurrently encrypt the destination address of the data packet while performing the mapping. The address translator 120 then transmits the packet.

The address translator 140 receives the data packet, decrypts the destination address, if necessary, and similarly checks whether the destination address is in the set of addresses to be translated at that particular time (step 680). Assuming that the answer is "yes," the address translator 140 translates the destination information back to the real destination information using the translation algorithm and then transmits the packet (step 690).

The above procedure describes a staggered remapping. In implementations consistent with the present invention, the interval of time between mapping the first and second set of address may be fixed. For example, the first set of addresses may be mapped beginning at 12:01 AM, the second set may be mapped beginning at 2:01 AM, the third set may be remapped at 4:01 AM, and so on, where the interval between mappings is set to two hours.

In a randomized mapping scheme, the interval between the mappings may be random, i.e., generated by a pseudo-random number generator program running concurrently on the address translator 120 and the address translator 140. Changing the interval between the mappings makes it more difficult for a hacker to determine the mapping scheme.

In alternative implementations consistent with the present invention, the particular set of addresses to be mapped at a given time may also be randomized in a similar manner. For example, a random number generator program running concurrently on the address translator 120 and the address translator 140 may generate a random set of addresses to map/translate at a particular time. Adding the additional randomness to the mapping/translating scheme further increases the work associated with a hacker trying to map the network.

In additional implementations consistent with the present invention, various elements of the synchronized, staggered and randomized mapping schemes may be combined in any number of ways to make the particular mapping scheme harder to detect. For example, a randomized mapping may be combined with a staggered mapping to randomize the interval that various destination addresses/ports are mapped and the interval between changing the mapping scheme and/or keys used for any or all of the addresses/ports.

Systems and methods consistent with the present invention provide dynamic mapping and translating of destination information. An advantage of the invention is that the mapping/translating functions are performed with no impact to clients 110 or to devices on network 170, such as server 150. That is, the clients 110 and server 150 may perform their tasks in their normal manner while the mapping/translating functions are performed. Another advantage of the invention is that the types of mapping/translating performed may be combined in any number of ways.

The present invention has been described with the example of the address translator 120 performing the mapping and the address translator 140 performing the translating. It should also be understood that when data packets are transmitted from server 150 to clients 110, the reverse process may be used. That is, since conventional data packets also include a source address, a hacker may attempt to map network 170 by using the source address information transmitted from server 150. Therefore, the address translator 140 may perform the mapping function and the address translator 120 may perform the translating function. In this manner, data packets transmitted in either direction over network 160 are protected from network discovery by using mapped destination information and encryption techniques.

Additionally, the present invention has been described in an environment with the address translator 140 communicates with a single host device, such as server 150, via network 170. In alternative implementations, server 150 or other hosts on network 170 may themselves be clients of other servers located elsewhere on network 160. In this case, address translator 140 maps the source address of outgoing data packets and translates the destination address of replies. In this manner, any data transmitted over an unsecured network, such as network 160 is protected from hackers attempting to perform network discovery.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, the present invention is described in an environment where the address translator 140 translates the mapped destination information back to the real destination information. In alternative implementations, however, a host device, such as server 150, may perform the translating functions performed by the address translator 140.

What is claimed is:

1. A method comprising:
   translating, in a first address translator, a first destination address of a data packet received over a network from a client to a second destination address of said data packet; and
   transmitting, from said first address translator over said network, said data packet with said second destination address included in said data packet, to a second address translator having said second destination address.

2. The method of claim 1, further comprising:
   translating, in said second address translator, said second destination address back to said first destination address.

3. The method of claim 2, further comprising:
   transmitting, over said network, said data packet from said second address translator to a server having said first destination address.

4. A system, comprising:
   a memory configured to store a mapping algorithm; and
   a processor configured to:
      receive in a first address translator a data packet with a first destination address included in said data packet,
      change said first destination address to a second destination address in said first address translator using said mapping algorithm, and
      transmit said data packet with said second destination address included in said data packet from said first address translator to a second address translator having said second destination address.

5. The system of claim 4 wherein said processor is further configured to:
   translate said second destination address back to said first destination address in said second address translator, and
   forward said data packet from said second address translator to a server having said first destination address.

6. A tangible computer-readable hardware medium having stored thereon a plurality of instructions; certain of which when executed by a processor cause said processor to:
   receive in a first address translator having a first address a data packet with a first destination address included in said data packet, said first destination address being different from said first address;
   change said first destination address to a second destination address in said first address translator using, a mapping algorithm; and
   transmit said data packet with said second destination address included in said data packet from said first address translator to a second address translator, said second address translator having said second destination address.

7. The tangible computer-readable hardware medium of claim 6 including instructions for causing said processor to:
   translate said second destination address back to said first destination address in said second address translator; and
   forward said data packet from said second address translator to a server having said first destination address.

* * * * *